Sept. 17, 1968     M. J. GEORGE     3,401,721
REMOVABLE HINGED COVER FOR A LAY-IN WIREWAY
Filed Nov. 5, 1965
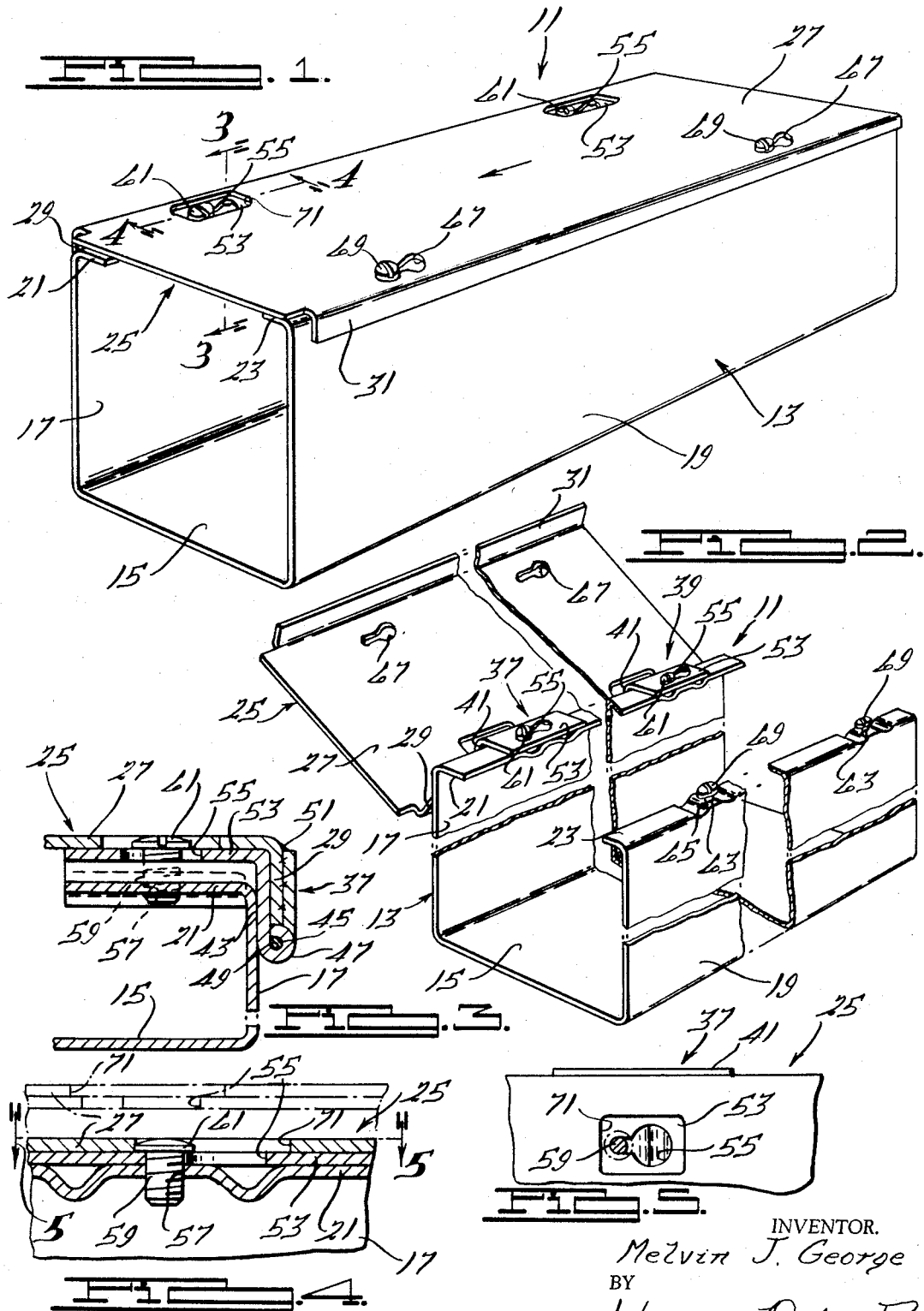
INVENTOR.
Melvin J. George
BY
Harness, Dickey & Pierce
ATTORNEYS.

United States Patent Office 3,401,721
Patented Sept. 17, 1968

3,401,721
REMOVABLE HINGED COVER FOR A
LAY-IN WIREWAY
Melvin J. George, Southfield, Mich., assignor to Keystone Manufacturing Company, Division of Avis Industrial Corporation, Warren, Mich., a corporation of Michigan
Filed Nov. 5, 1965, Ser. No. 506,519
6 Claims. (Cl. 138—92)

ABSTRACT OF THE DISCLOSURE

The invention comprises a lay-in wireway having an elongate three sided conduit provided with an open side which normally is closed by a hinged cover. One plate of the hinge is fixed to the cover and the other plate thereof is detachably fastened to the conduit. To this end, the last mentioned hinge plate is interposed between the cover and the conduit and has a portion which overlies the conduit and underlies the cover. A fastening screw is threaded into the conduit through a keyhole slot in the mentioned portion of the hinge plate and an access opening is provided in the cover which registers with and receives the head of the screw when the cover is closed. Thus, the head of the screw can be reached through the access hole in the cover to tighten or loosen the screw so that the cover can be selectively opened and closed on the hinge or removed completely from the conduit simply by loosening said fastening screw all from a position directly in front of the wireway and without the necessity of access to any side of the conduit.

This invention relates generally to wireways, and particularly to a lay-in wireway conduit having a novel hinged and removable cover.

Wireways of the type to which the present invention relates are used to house electrical wiring for various fixtures, appliances and machinery and are constructed so that the wiring and connections may be "laid in" from one side thereof. To effect this, it is necessary that the wireway conduits, which are generally rectangular in cross-section, have one side which may be opened allowing free access to the conduit so that the wiring need not have to be fed longitudinally through the wireway. In addition to the above, wireways of this type are particularly advantageous in plant installations where unusually complex and heavy-duty wiring systems are required and wherein these systems are subject to frequent change and/or modification. Thus, the wiring and connectors are easily accessible simply by opening appropriate one or ones of the conduits.

In the past, wireway conduits have generally been constructed with one open side and provided with a cover for closing this open side. These covers for the most part are either hinged to the conduit along one edge or they are removably secured to the conduit, such as, for example, by screws passing through openings in the cover and threaded into the conduit.

Each of these types of conduit covers has its own advantages and in different installations, or in different areas of the same installation, one type may be more desirable than the other. Thus, in particular installations or areas of installations where the wireway conduits are in close, confining spaces, there may not be sufficient room to manipulate a hinged cover, the hinged cover even when fully opened may not provide the needed working space or it may obstruct other wiring, components, etc. so that only a removable cover may be used practically. However, where possible, it is most desirable to use hinged covers since these are the easiest to work with and do not require that the cover be removed, set aside and then replaced each time work is done on the wiring. The problem becomes apparent when considering that wireway installations are made up of numerous conduits laid end-to-end and each of which has an open side and its own cover.

A few wireway conduits having combination hinged and removable covers have been proposed; however, each of these requires that the cover be substantially fully opened before it can be removed from the conduit. These conduits are, therefore, not fully satisfactory since the particular installation where the conduit is located may make it difficult or even impossible to fully open the cover so that the removable feature of the cover cannot be taken advantage of.

A main object of the present invention, therefore, is to provide a lay-in wireway conduit having a combination hinged and removable cover wherein the cover is fully removable from and replaceable on the conduit without being in an open position.

Further objects of the present invention include a conduit and cover of the above character which is relatively inexpensive to manufacture, rugged in construction, easy to manipulate and reliable in use.

Other objects and advantages of the present invention will become more apparent from a consideration of the following detailed description taken in conjunction with the drawings in which:

FIGURE 1 is a perspective illustration of a lay-in wireway conduit and cover embodying the present invention;

FIG. 2 is a view similar to FIG. 1 showing the cover in an open, hinged position;

FIG. 3 is an enlarged sectional view of a portion of FIG. 1 taken along the line 3—3 thereof;

FIG. 4 is an enlarged sectional view of a portion of FIG. 1 taken along the line 4—4 thereof; and FIG. 5 is a top plan view of FIG. 4 looking in the direction of the arrows 5—5.

Broadly described, the present invention includes an elongate, generally rectangular cross-sectional conduit having one open side, a cover for said conduit open side, at least one hinge means interconnecting said conduit and one side of said cover, said hinge means including a pair of pivotally interconnected hinge plates, one of which is secured to one of said conduit and said cover one side, means removably interconnecting the other of said plates to the other of said conduit and cover one side, said last-mentioned means comprising a first keyhole slot in said other plate a screw threaded into the other of said conduit and cover one side and extending through said first keyhole slot, means releasably securing the other side of said cover to said conduit whereby said cover is hingedly movable relative to said conduit and is removable therefrom by moving said cover relative to said conduit in a plane parallel to the longitudinal axis of said conduit.

Referring now more specifically to the drawings, a lay-in wireway embodying the present invention is illustrated generally at 11 and is seen to include an elongate, generally rectangular conduit 13 having a bottom wall 15 and a pair of upstanding generally parallel side walls 17, 19. Each of the side walls 17, 19 has an inwardly directed right-angle flange 21, 23, respectively, along the upper edge thereof leaving the top side of the conduit 13 substantially completely open.

A cover 25 is provided for the conduit 13 to substantially completely close the open top side of the conduit when in place thereon. As shown, the cover 25 includes a generally flat wall 27 adapted to overlie the open top side of the conduit 13 and the inturned flanges 21, 23. The longitudinal edges of the cover wall 27 are bent downwardly substantially at right angles thereto as at 29, 31 and are adapted to overlie the conduit side walls, 17, 19, respectively, when the cover 25 is closed. The cover side edges 29, 31 extend throughout a major portion of the length of the cover wall 27.

The cover 25 is hingedly secured at one side thereof to the conduit 13 by at least one, and preferably two or more hinge devices 37, 39. Since these hinge devices, 37, 39 are identical, a description of one will suffice here. As shown perhaps best in FIG. 3, the hinge device 37 includes a pair of plates 41, 43 pivotally interconnected at one end by a pivot pin 45. As is conventionally done, these ends of the plates 41, 43 are bent back on themselves as at 47 forming aligned circular openings 49 through which the pivot pin 45 extends. The plate 41 overlies the cover edge 29 and is fixed thereto as by welding at 51. The plate 43 is positioned within the cover edge 29 and has its upper end 53 bent at right angles to overlie the conduit flange 21 beneath the cover wall 27. The plate upper end 53 has a keyhole slot 55 formed therein adapted to align with a threaded opening 57 in the flange 21. A screw 59 extends through the slot 55 and is threaded into the opening 57 and has a head 61 larger than the smaller end but smaller than the larger end of the slot 55.

When the hinge plate upper end 53 is positioned with the screw head 61 overlying the smaller end of the keyhole slot 55, the hinge device 37 and therefore the cover 25 is hingedly mounted on the conduit 13 whereas when the screw head 61 is aligned with the larger end of the keyhole slot 55, the hinge device 37 and therefore the cover 25 is removable from the conduit 13. Thus, by simply loosening the screw 59, the cover 25 can be slid longitudinally of the conduit 13 in either direction to provide that the cover 25 and conduit 13 are hingedly connected or that the cover 25 is removable from the conduit 13.

When a relatively long conduit 13 and cover 25 are employed, more than one hinge device is desirable, two such hinge devices being shown at 37, 39. In each case, the hinge plate upper ends 53 are provided with an identical keyhole slot 55 and are secured to the conduit flange 21 by an identical screw 59 so that longitudinal sliding movement of the cover 25, as described above, brings substantially the same portion of each keyhole slot 55 into registry with its associated screw 59 and screw head 61.

When the cover 25 is closed upon the conduit 13, it is desirable that they be releasably locked to prevent the cover from inadvertently or accidentally opening. To achieve this, one or more screws 63 are threaded into threaded openings 65 in the conduit flange 23 and are adapted to extend through corresponding keyhole slots 67 in the cover wall 27. Each of these screws 63 has a head 69 larger than the smaller end but smaller than the larger end of the keyhole slots 67 as was the case with the screw heads 61 and the keyhole slots 55.

In addition, the screws 59, 63 and the keyhole slots 55, 67 are positioned so that when the cover 25 is slid longitudinally of the conduit 13 in one direction, the screw heads 61, 69 all are brought into registry with the smaller end of their associated keyhole slots 55, 67. Similarly, when the cover 25 is slid longitudinally of the conduit 13 in the other direction, the screw heads 61, 69 register with the larger ends of the keyhole slots 55, 67, respectively. Thus, when the cover 25 is closed upon the conduit 13 with the screw heads 61, 69 all in registry with the smaller ends of the keyhole slots 55, 67, respectively, as shown in FIG. 1, the cover 25 is securely held in place on the conduit 13. By loosening the screws 59, 63 slightly and sliding the conduit cover 25 longitudinally of the conduit 13 to register the screw heads 61, 69 with the larger ends of the keyhole slots 55, 67, the cover 25 is completely removable from the conduit 13. Alternatively, when the cover 25 is positioned with the larger ends of the keyhole slots 55, 67 in registry with the screw heads 61, 69, the cover 25 can be swung open in hinged fashion as shown in FIG. 2. To effect this, it is only necessary to lift up on the cover edge 31 to disengage the keyhole slots 67 from the screw heads 69 and hold down the other edge of the cover 25 so that the keyhole slots 55 do not completely disengage from the screw heads 61. Once the keyhole slots 67 and screw heads 69 are disengaged, the cover 25 can then be slid longitudinally back to register the screw heads 61 with the smaller ends of the keyhole slots 55. If desired, the keyhole slots 55 could have a longer smaller end than the keyhole slots 67 so that the cover 25 could be hingedly manipulated by sliding it to an intermediate longitudinal position where the screw heads 61 would still be registered with the smaller ends of the keyhole slots 55 while the screw heads 69 are in registry with the larger ends of the keyhole slots 67.

To reposition the cover in a closed position on the conduit 13, after the cover has been hingedly opened, as is shown in FIG. 2, the cover 25 is pivoted back toward the conduit 13 and is slid longitudinally thereof to bring the larger ends of the keyhole slots 67 into registry with the screw heads 69. To cover 25 is then fully closed and slid longitudinally back to register the smaller ends of the keyhole slots 55, 67 with the screw heads 61, 67, respectively, whereupon the screws 59, 63 are retightened.

As shown in the figures, the cover wall 27 is apertured at 71 so as to permit free access to the screw heads 61 of the screws 59 when the cover 25 is closed. In addition, the apertures 71 overlie the conduit flange 21 so that when the cover 25 is closed, dirt, grease and other foreign matter cannot get into the conduit 13. Furthermore, and most importantly, the fastening screws 59, 63 are all accessible from the top or front of the wireway 11 and whether the cover 25 is opened or closed. Thus, even when surrounding structure prevents the cover 25 from being fully opened, the cover is easily removable from the conduit 13 as described above. Also, the cover 25 is removable from the conduit 13 when fully opened in hinged fashion, if desired.

By the present invention, there has been disclosed an improved lay-in wireway conduit and cover calculated to fulfill the objects of the invention hereinabove set forth and while a preferred embodiment thereof has been illustrated and described above in detail, various additions, substitutions, modifications and omissions may be made thereto without departing from the spirit of the invention as encompassed by the appended claims.

What is claimed is:

1. A lay-in wireway comprising an elongate, generally rectangular cross-sectional conduit having one open side, a cover for said conduit open side, at least one hinge means interconnecting said conduit and one side of said cover, said hinge means including a pair of pivotally interconnected hinge plates one of which is secured to said cover one side and the other of which has a portion thereof overlying said conduit and underlying said cover, means removably interconnecting the other of said hinge plates to said conduit comprising a first keyhole slot in the mentioned portion of said other hinge plate, a screw threaded into said conduit and adapted to extend through said first keyhole slot, and an access opening in said cover adapted to register with the head of said screw and to receive the same when said cover is closed and through which said head can be reached to tighten or loosen said screw, means releasably securing the other side of said cover to said conduit, whereby said cover is selectively hingedly movable relative to said conduit or removable therefrom by moving said cover relative to said conduit in a plane parallel to the longitudinal axis of said conduit.

2. A wireway as defined in claim 1 wherein said conduit includes at least one inwardly directed flange at its open side and wherein the mentioned portion of said other hinge plate overlies said flange and said screw is threaded into said flange.

3. A wireway as defined in claim 1 wherein said conduit includes an inwardly directed flange along each edge of its open side, wherein the mentioned portion of said other hinge plate overlies one said flange and said screw is threaded into said one flange, and wherein said releasable securing means comprises at least one screw extending through said cover and threaded into the other of said flanges.

4. A wireway as defined in claim 1 wherein said conduit includes an inwardly directed flange along each edge of its open side, wherein the mentioned portion of said other hinge plate overlies one said flange and said screw is threaded into said one flange, and wherein said releasable securing means comprises at least one screw extending through a keyhole slot in said cover and threaded into the other of said flanges.

5. A wireway as defined in claim 1 which includes an identical pair of spaced hinge means and a corresponding pair of spaced screws.

6. A wireway as defined in claim 4 which includes an identical pair of spaced hinge means and a corresponding pair of spaced screws, and wherein said keyhole slot in said cover is substantially identical to the keyhole slot in said hinge means.

References Cited

UNITED STATES PATENTS

| | | | |
|---|---|---|---|
| 1,473,290 | 11/1923 | Hammer | 220—31 |
| 2,332,017 | 10/1943 | Sedgwick | 220—31 |
| 2,905,201 | 9/1959 | McNaughton | 138—159 X |
| 3,003,794 | 10/1961 | Burley | 138—92 X |
| 3,243,503 | 3/1966 | Burley | 138—159 X |

LAVERNE D. GEIGER, *Primary Examiner.*

C. L. HOUCK, *Assistant Examiner.*